May 27, 1941.    C. S. THOMPSON    2,243,660
VIBRATION CONTROLLING AND DAMPING DEVICE
Filed April 5, 1938    2 Sheets-Sheet 1
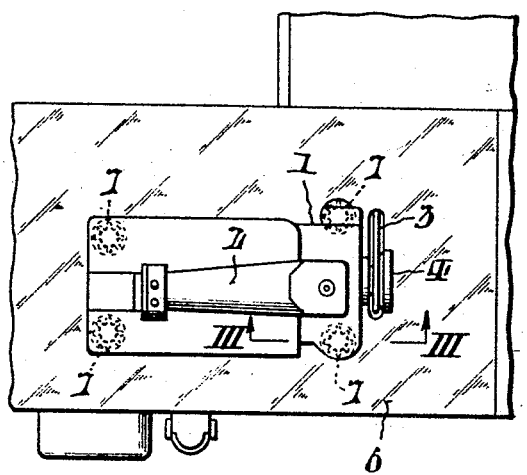
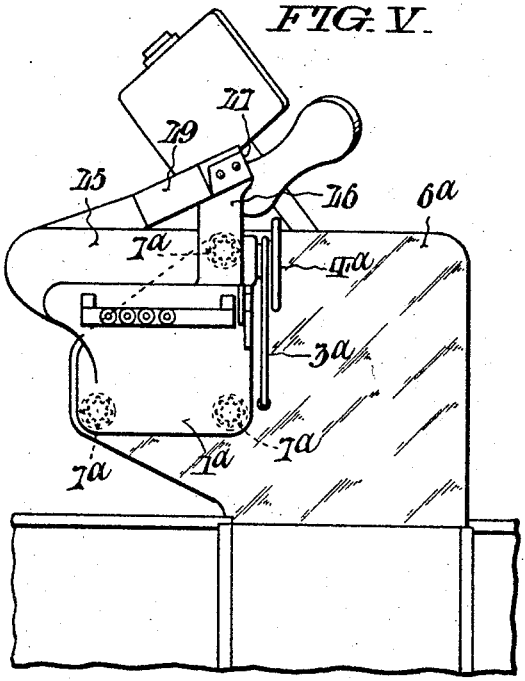
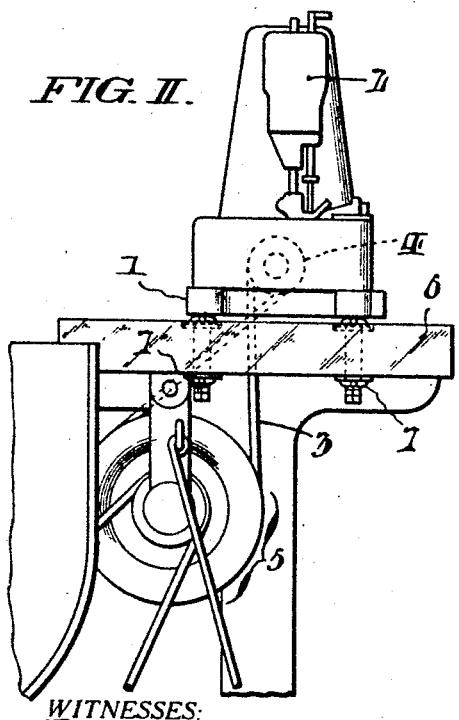
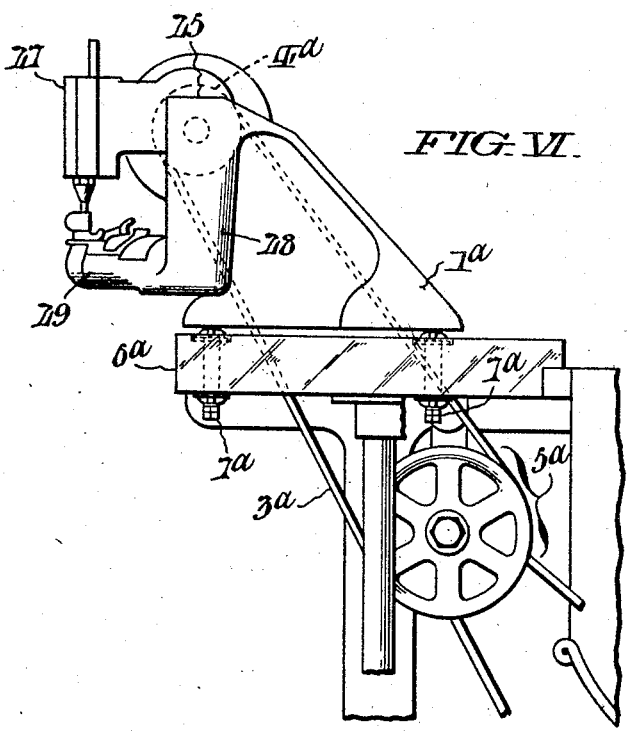
WITNESSES:
John C. Bergner
William Bell, Jr.
INVENTOR:
Charles S. Thompson,
BY Paul Paul
ATTORNEYS.

May 27, 1941.  C. S. THOMPSON  2,243,660

VIBRATION CONTROLLING AND DAMPING DEVICE

Filed April 5, 1938  2 Sheets-Sheet 2

FIG. III.

FIG. IV.

WITNESSES:
John C. Bergner
William Bell, Jr.

INVENTOR:
Charles S. Thompson,
BY Paul & Paul
ATTORNEYS.

Patented May 27, 1941

2,243,660

UNITED STATES PATENT OFFICE 2,243,660

VIBRATION CONTROLLING AND DAMPING DEVICE

Charles S. Thompson, Elmhurst, Ill., assignor to Union Special Machine Company, Chicago, Ill., a corporation of Illinois Application April 5, 1938, Serial No. 200,077

7 Claims. (Cl. 248—21)

This invention relates to vibration controlling and damping devices useful in connection with mountings or supports for different types of machines, particularly sewing machines.

In order to secure a maximum output from them, sewing machines are run at high speeds; but notwithstanding careful design and dynamic balancing of their moving parts, it is difficult to satisfactorily eliminate the vibration and noise incident to their operation, both of which increase in proportion to the speed.

The primary object of my invention is to compensate for the above mentioned deficiency, that is to say, I aim to make it possible to effectively control and minimize the vibrations attending operation of sewing machines and the like at maximum speeds, and at the same time prevent the transmission of the vibrations to the supports on which the machines are mounted.

This desideratum I realize in practice as hereinafter more fully set forth in detail, through provision of a vibration controlling and damping device which is designed for use as a unit with one or more suitably arranged similar devices in connection with mountings or supports for sewing or other machines, and which is not only capable of checking both downward and rebound movements, but of absorbing them so as to preclude their transmission to the mountings or supports.

Another aim of my invention is to attain the foregoing advantages in a vibration controlling and damping device which is simple and inexpensive to manufacture, easy to apply, and which can be adjusted independently of the others with which it is used in association, for adaptability to machines of different types, sizes and weights.

Other objects and advantages inherent to my invention will appear from the following detailed description of the attached drawings, wherein Figs. I and II are respectively a fragmentary plan and a fragmentary end view of a table whereon a sewing machine of the flat bed type is sustained with vibration controlling and damping devices embodying the present improvements.

Fig. III is a detail view drawn to a larger scale and looking as indicated by the arrows III—III in Fig. I.

Fig. IV is a view showing the bottom plan of one of the devices.

Figs. V and VI are views respectively like Figs. I and II exemplifying the use of the vibration controlling and damping devices of my invention with a sewing machine of the feed off the arm type.

The sewing machine shown in Figs. I and II is of well known design, having a flat rectangular base 1 whereof the top serves as a work support, and an overhanging needle arm 2. The machine is arranged to be driven, after common practice, by a belt 3 which connects its pulley 4 with a power transmitter 5 suspended from the supporting table 6.

In connection with a sewing machine of the above character, I preferably employ four of my vibration controlling and damping devices—one at each corner of the base 1—said devices being generally designated by the numeral 7. As shown in Figs. III and IV, each device 7 comprises a projecting member on the sewing machine frame in the form of a screw bolt 8 which is threaded up into a tapped hole 9 in the machine base 1 so as to depend from the latter, with clearance all around, down through a cylindric opening 10 of larger diameter in the table 6. Surrounding the bolt 8 within the opening 10 of the table 6 is a two part bushing 11 of felt or other suitable sound deadening material which has projection above and below the table 6. In turn surrounding the bushing 11 at the top is a muffling element in the form of a washer 12 or like material which is set in a counter-bored recess 13 in the top of the table, said recess being coaxial with the opening 10. A similar resilient element or washer 14 of felt or the like surrounds the lower protruding end of the bushing 11 and abuts the underside of the table 6. Bearing respectively against the felt washers 12 and 14 from above and below, are metallic elements likewise in the form of washers 15, 16 which constitute reacting surfaces for metallic spring elements having, in this instance, the form of radially-expansible spiders 18 which are made with a thickness and curvature to exert the proper reactive force. These spring spiders are reversed in position, one in respect to the other. As shown, each spider 18 is axially apertured to loosely engage the bolt 8 and formed with equi-spaced flexible tongues 19 which are bowed or arched to overreach the top of the bushing 10 and which have their ends upwardly curled so as to readily slide on the metallic washers 15, 16. Interposed between the upper spider 18 and the base of the sewing machine is a small metallic washer 20; and interposed between the lower spider 18 and an abutment in the form of an adjusting nut 21 threadedly engaging the lower end of the screw bolt, is a small metallic washer 22. From Fig. III, it will be noted that the adjusting nut 21 is backed by a jam nut 23, and that the end of the bolt 8 is cut away at opposite sides as at 24 with resultant formation of a polygonal projection whereto a wrench may be applied in screwing said bolt upwardly into the sewing machine.

In setting up the machine upon the table 6, the vibration controlling and damping devices 7 are assembled with it and initially adjusted and put under compression. The machine is then brought up to speed and by proper assemblage of the devices and by adjustment of the nuts 21, a condition is reached in which a minimum of vibration and noise is attained.

With adjustments properly made, when pressure is exerted upon the upper radially-tongued spring elements 18 of the several devices 7 by downward movements of the machine, such pressure will be counteracted by increasing radial frictional resistance between the ends of the tongues of said elements and the top surfaces of the washers 15. The lower spring elements 18 of the devices 7 will, on the other hand, react in precisely the same manner when compressed by upward movements of the machine. Accordingly, under the influence of the opposing spring elements 18, the vibrations of the machine will be effectively absorbed, while the felt sleeves 11 and the washers 12 and 14 function to prevent transmission of the vibrations to the table 6 and so preclude noises which would otherwise result. In this way a balance is established such that the machine will be substantially stable and quiet in its operation.

In Figs. V and VI, I have illustrated how my vibration controlling and damping devices are intended to be used in connection with the support of a sewing machine of a feed off the arm type in which the weight is more or less unevenly distributed. As shown, the frame of the machine has a bracket-like base 1a with an integrally-formed longitudinally-extending elevated portion 25. Projecting laterally from one end of the longitudinal frame portion 25 is a neck 26 with a terminal head 27 in which the needle bar of the machine is guided; and connected to a pendant projection 28 at the opposite end of said frame portion 25 is a work arm 29 whereof the free end underreaches a needle head. The machine moreover has a pulley 4a which, by means of a belt 3a, is connected to a power transmitter 5a hung from the bottom of the support 6a. From Fig. VI, it will be noted that considerable of the weight of the feed off the arm sewing machine is concentrated near the front edge of the base 1a due to the outboard extension of the needle head 27 and the work arm 29 beyond said edge. For such a sewing machine I employ three of my improved vibration controlling and damping devices, which are respectively designated in this instance by the reference character 7a, one at each rear corner of the base 1a, and one at the front corner substantially in the vertical plane of the neck 26. It is of course to be understood that the devices 7a are of exactly the same design and construction as the one detailed in Figs. III and IV. As before, upon setting up the machine with the vibration controlling and damping devices, the machine is run at the desired operating speed incident to which said devices are individually adjusted until the proper cushioning balance is obtained. Due to the uneven distribution of the weight of the machine, the device 7a at the front corner may be obliged to absorb mostly the downward movements and those at the rear corners, mostly the upward or rebound movements. It will thus be seen that the capacity for independent adjustment of the vibration controlling and damping devices is of the utmost importance.

Having thus described my invention, I claim:

1. A vibration controlling and damping device adapted to be used as a unit with one or more similar devices at spaced intervals in connection with a mounting or support for a sewing machine or the like, comprising a screw bolt pendant from the base of the machine and passing, with clearance all around, down through an opening of larger diameter in the support; a bushing of sound deadening material surrounding the bolt within the opening and having projection above and below the support; washers of sound deadening material respectively surrounding the upper and lower protruding ends of the bushing and abutting the top and bottom of the support; metallic washers similarly surrounding the upper and lower ends of the bushing and resting against the sound deadening washers; a resilient element surrounding the bolt and spanning the upper protruding end of the sleeve, said element being in compression between the base of the machine and the upper metallic washer; and a similar resilient element spanning the lower protruding end of the sleeve and being in compression between the lower metallic washer and an adjusting nut in threaded engagement with the lower end of the screw bolt.

2. A vibration controlling and damping device adapted to be used as a unit with one or more similar devices at spaced intervals in connection with a mounting or support for a sewing machine or the like, comprising a screw bolt pendant from the base of the machine and passing, with clearance all around, down through an opening of larger diameter in the support; a bushing of sound deadening material surrounding the bolt within the opening and having projection above and below the support; washers of sound deadening material respectively surrounding the upper and lower protruding ends of the bushing and abutting the top and bottom of the support; metallic washers similarly surrounding the upper and lower ends of the bushing and resting against the sound deadening washers; a spring element in compression between the base of the machine and the upper metallic washer, said element in the form of an axially-apertured spider free on the bolt and having downward flexible radial fingers with curled ends bearing upon said upper metallic washer; and a similar spider interposed in inverted position between the lower metallic washer and an adjusting nut having threaded engagement with the lower end of the screw bolt.

3. A vibration controlling and damping device adapted to be used in connection with a support for a sewing machine or the like, comprising a projecting member on the frame of the machine which passes, with clearance all around, through an opening in the support; resilient elements of sound deadening material surrounding the projecting member and respectively engaging the opposite sides of the support; metallic plate elements surrounding the projecting member with intervening clearance and resting against the resilient elements; and spring elements with flexible radially-arranged tongues surrounding the projecting member, one of said spring elements being in compression between the frame of the machine and the contiguous metallic plate element with the ends of its tongues frictionally bearing on said plate element, and the other of said spring elements being in compression between the other metallic plate element and an adjustable abutment on the protruding end of the projecting member with the ends of the tongues of the last mentioned spring element frictionally bearing on said other plate element.

4. A vibration controlling and damping device adapted to be used in connection with a support for a sewing machine or the like, comprising a projecting member on the frame of the machine which passes, with clearance all around, through an opening in the support; an adjustable abutment on the protruding end of said member; a bushing of sound deadening material surrounding the projecting member within the opening of the support; resilient elements of sound deadening material surrounding the projecting member and respectively engaging the opposite sides of the support; metallic plate elements surrounding the projecting member with intervening clearance and resting against the resilient elements; and a pair of radially tongued opposing spring elements surrounding the projecting member, whereof one is positioned between the frame of the machine and the contiguous metallic plate element, and whereof the other spring element is positioned between the other metallic plate element and the adjustable abutment, whereby pressure on said spring elements is counteracted by increasing radial friction between the outer ends of their tongues and the surfaces on which they bear.

5. A vibration controlling and damping device adapted to be used in connection with a support for a sewing machine or the like, comprising a bolt pendant from the base of the machine and passing down, with clearance all around, through an opening in the support; an adjustable nut on the protruding end of the bolt; resilient members of sound deadening material surrounding the bolt and respectively engaging the top and bottom surface of the support; metallic washers surrounding the bolt with intervening annular clearance and resting against the resilient members; and a pair of radially-tongued opposing spring elements surrounding the bolts, said elements being respectively positioned between the base of the machine and the upper metallic washer, and between the lower metallic washer and the adjustable nut with the ends of their tongues bearing respectively on the washers, whereby pressure upon said spring elements is counteracted by increasing radial frictional resistance between the outer ends of their tongues and the metallic washers.

6. A vibration controlling and damping device adapted to be used in connection with a support for a sewing machine or the like, comprising a bolt pendant from the base of the machine and passing down, with clearance all around, through an opening in the support; an abutment nut adjustable on the protruding end of the bolt; a bushing of sound deadening material surrounding the bolt within the opening of the support; resilient members of sound deadening material surrounding the bolt and respectively engaging the top and bottom surface of the support; metallic washers surrounding the bolt with intervening annular clearance and resting against the resilient members; and opposing radially-tongued spring elements surrounding the bolt, said elements being respectively positioned between the base of the machine and the upper metallic washer and between the lower metallic washer and the adjustable nut, whereby pressure on said spring elements is counteracted by increasing radial friction between the outer ends of their tongues and the metallic washers.

7. Vibration controlling and damping means for sewing machines or the like comprising, in combination with a support, a plurality of independently-adjustable devices by which the machine is suspended at different points, each such device including a stud which projects downward from the machine base and which passes, with clearance all around, through an opening in the support, an adjustable abutment on the outer end of the stud, and a pair of opposingly-arranged apertured vibration-absorbing annular spring spiders loosely fitting around the stud, one in compression between the machine base and the support, and the other in compression between the abutment and the support, said spiders having radially-extending fingers which respectively bear against the opposite sides of the support and by varied frictional pressure upon the latter incident to enforced flexure, operate to progressively check and dampen vibrations set up during the operation of the machine.

CHARLES S. THOMPSON.